Figure 1:
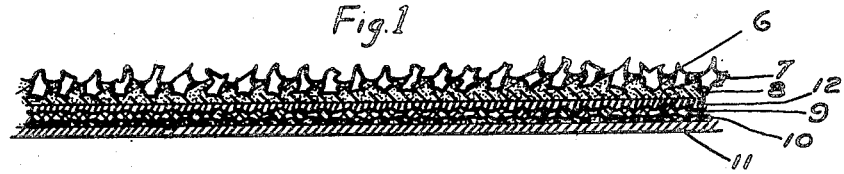

Dec. 19, 1950         D. A. WATERFIELD        2,534,805

COATED ABRASIVE ARTICLES AND BACKINGS FOR SUCH ARTICLES

Filed March 10, 1947

INVENTOR.
DONALD A. WATERFIELD
BY Nicholas E. Oglesby
AGENT

Patented Dec. 19, 1950

2,534,805

UNITED STATES PATENT OFFICE 2,534,805

COATED ABRASIVE ARTICLES AND
BACKINGS FOR SUCH ARTICLES

Donald A. Waterfield, Brunswick, N. Y., assignor to Behr-Manning Corporation, Troy, N. Y., a corporation of Massachusetts Application March 10, 1947, Serial No. 733,614

9 Claims. (Cl. 51—297)

This invention relates to coated abrasives made on a laminated backing and to laminated backings useful in the manufacture of coated abrasives. By coated abrasives I mean to include sandpaper, emery cloth and similar materials which usually comprise a reinforcing layer or support having on one or both sides an adhesively attached abrasive surface of grits. The grits or abrasive particles comprise some suitable material such as emery, artificially fused aluminum oxide of abrasive grade, flint, garnet, corundum, silicon carbide, etc., or mixtures thereof.

Laminated backings useful in the manufacture of coated abrasives include laminations of cloth to paper, cloth to vulcanized fibre, cloth to cloth, paper to paper, paper to vulcanized fibre and vulcanized fibre to vulcanized fibre. The laminations with which this invention is concerned are made by adhesively uniting two or more layers selected from such materials or similar materials.

It is an object of the present invention to improve the heat resistance of laminated backings united with an animal glue or an animal glue modified with such materials as vegetable glues.

It is a further object of this invention to modify the laminated backing so that the coated abrasive made therewith is less subject to curling and/or distortion when exposed to variable humidities.

It is a further object of this invention to provide cheaper laminated backings than those heretofore made with animal glue adhesive or animal glue adhesive modified with dextrin, starch or the like.

It is a further object of this invention to provide processes which are more readily carried out, especially in hot weather, than the processes heretofore carried out with adhesives of the animal glue type.

In the past these laminated backings commonly and extensively have been made with hide glue as the laminating adhesive. Furthermore, for many years the commonly used adhesives for uniting the abrasive grains to the combination backings were hide glues.

More recently there has been extensive use of the modified adhesives disclosed in U. S. Patent No. 2,322,156, issued June 15, 1943 to Nicholas E. Oglesby, for holding the abrasive grains to the backing. Such modified adhesives have the advantages for such uses as are pointed out in the said patent to Nicholas E. Oglesby.

When abrasive articles, as, for example, abrasive discs, are made on a laminated backing, as, for example, a laminated backing consisting of a ply of drills cloth and a ply of 10 mil fibre adhesively united with hide glue and either hide glue or the modified hide glue binders disclosed by U. S. Patent No. 2,322,156, are used to anchor the abrasive grains to the backing, such discs tend to cup or curl, especially when exposed to low humidities.

This cupping or curling of such discs or other articles when exposed to low humidities is due to the fact that the laminated backings contract more rapidly on drying out than the adhesive-abrasive coatings attached to the backings. Since the adhesive-abrasive coatings in which the adhesives of U. S. Patent No. 2,322,156 are used to anchor the grains contract less rapidly than the adhesive-abrasive coatings in which the adhesive is straight hide glue, discs and the like made with the special adhesives of U. S. Patent No. 2,322,156 tend to curl more at low humidities, if made on the conventional laminated (i. e. combination) backings of the prior art in which hide glue is used to unite the plies of the backing as, for example, a ply of cloth and a ply of vulcanized fibre.

Many discs of the prior art over a period of many years were made by attaching abrasive grain by a hide glue adhesive to the cloth side of a laminated backing consisting of one ply of cloth attached to one ply of vulcanized fibre by hide glue. These discs were highly successful as compared with discs that had been made prior thereto, the backings of which consisted of paper or a lamination of ordinary paper and cloth. However, such discs, made with a fibre-cloth combination backing, were subject to failure due to the lack of heat resistance of the hide glue used to anchor the abrasive grains to the backing. Discs made upon the same laminated backing by employing the modified hide glue adhesives of U. S. Patent No. 2,322,156 were, therefore, found to be far superior to the discs of the prior art in which unmodified hide glue was used as a binder to attach the abrasive grains to the backing. However, I have discovered that in some instances wherein a great deal of heat is generated, such discs made with the modified adhesives may fail due to a separation of the cloth and vulcanized fibre plies because of the softening or melting of the hide glue used as a laminating adhesive.

My invention overcomes this difficulty by providing a laminating adhesive consisting of a modified animal glue which is more heat resistant than the unmodified hide glues of the prior art. Furthermore, my laminated backing contracts at a lower rate when exposed to low humidities and allowed to lose water and expands at a lower rate when exposed to higher humidities and allowed to pick up water than the laminated backings of the prior art in which unmodified hide glue has been used as the laminating adhesive and, therefore, abrasive discs and other coated abrasives made on my special laminated backings curl less, when exposed to variable humidities including higher humidities and in particular to lower humidities, than discs and other coated abrasives of the prior art in which unmodified glue was used as an adhesive to unite the plies of their laminated backing.

I have accomplished the improvements of my new coated abrasive and new laminated backing by modifying the animal glue or the animal glue to which has been added a certain amount of vegetable glue or the like by incorporating in the adhesives a material effective to raise the softening point of the said adhesives and thereby increase their heat resistance, and also effective to lower the rates of expansions or contractions of the dried adhesives with increases or decreases in the humidity in the air surrounding the said articles.

I find the fillers used to modify the abrasive grit-holding binders of U. S. Patent No. 2,322,156 to be well adapted to my purposes. Such fillers have been well described in this patent.

In general these fillers are relatively hard and dense as compared with the organic binders and such fillers as wood flour, are non-porous and non-absorbent of either the adhesive or the solvent used in the adhesive, are not swelled by water and are inert or relatively non-reactive with respect to the adhesives themselves at the coating and curing or drying temperatures employed.

By stating that my filler is hard I mean that it is relatively hard as compared with the binder, especially at elevated temperatures encountered in the use of the various abrasive articles, such as belts and discs or drum covers and the like with which this invention is concerned, i. e. my filler is not materially softened at such elevated temperatures. By the term "non-fibrous" I mean to distinguish the fillers used from fibrous materials such as asbestos or cotton. By the term "non-absorbent" is meant that the filler does not appreciably absorb either the adhesive or the solvent, as has been found to be objectionable in the case of wood flour. By the terms "inelastic" and "non-deformable" is meant that the filler exhibits the above-specified characteristics under normal temperatures such as 70° F. By the term "dense" is meant that the filler, as compared with wood flour, is relatively free of pores and has a high degree of density.

The fillers used in this invention are not pulverized, that is, they are not of a size associated with dust, since such small particles, when dispersed in my adhesives in the quantities required to accomplish my purpose, do not produce a readily coatable adhesive or an adhesive that flows properly during the coating operations.

Particle shapes which trend towards the cubical or spherical as distinguished from such shapes as elongated spikes and thin wafers are preferred. Such stronger shaped fillers pack more densely in the adhesive and can be used in a higher percentage by weight or volume to impart greater hardness, greater resistance to heat, and more resistance to moisture, to the binders.

To accomplish my purposes a relatively high percentage of filler is used in the binder. Preferred compositions of adhesive in the dried state contain from about 25 to about 45 percent by volume of the inert fillers. Such adhesives are useful as both combining coats and sizing coats for the laminated backings but of the two, the more important use is as a combining adhesive.

Comminuted materials generally sold in the trade which have the required properties of relative hardness, non-porosity and chemical inertness to the binders used under the conditions of use, may have to be re-graded to obtain desirable particle sizes and desirable distributions of particle sizes before use for the purposes of this invention.

The average surface diameter is a valuable guide in the selection of suitable fillers or modifying agents for the preparation of my adhesives.

Preferably the average surface diameter is not greater than about 28 microns nor less than about 7 or 8 microns, although acceptable results may in certain instances be obtained within an average surface diameter range of from about 5.5 to about 6.5 microns to 40 microns.

With respect to the limits of coarse material, it is usually preferred that the modifying agents or fillers used in this invention pass a 270 mesh screen having a mesh opening of 53 microns, or in most instances that the material pass through a screen with 325 meshes to the linear inch, that is, a screen having a mesh opening of 44 microns. However, acceptable results may sometimes be obtained if not more than 35 percent by volume or by weight of the modifying agent or filler remains on the said 270 mesh screen, while not less than 65 percent by volume or weight, passes the screen. Furthermore it is preferable that the finer not less than 65 percent passing the screen have an average surface diameter in the range of about 5.5 to 40 microns.

In general I also prefer to use modifying agents or fillers which do not contain more than 12 percent by volume or by weight of particles having a diameter below two microns.

Where the terms "diameter," "average surface diameter" or "percent by weight or by volume" are used herein, it is contemplated that the numerical values for such terms will be determined as set forth in U. S. Patent No. 2,322,156.

Many materials are suitable as a basis for my fillers or modifying agents, provided the fillers have the particle sizes and other properties set forth herein. A preferred material for use in the preparation of my fillers or modifying agents is ground calcium carbonate derived from either reasonably pure limestone or from marble. Other suitable base materials include calcium phosphate, fused aluminum oxide, garnet, quartz and, in some cases, a few special clays provided the particle sizes and distribution of particle sizes are as provided herein and provided that the final form of the filler has the other properties set forth as required.

In general I prefer not to use quartz or any form of filler or modifier containing appreciable quantities of free silica in the sizing coat applied over one lamina of the laminated backing as a base for the making coat of adhesive with which the grains are to be anchored to the backing. This is because of the possibility that some of the free silica might be thrown into the air in an abrading operation and might thereby create the hazard of personnel contracting silicosis. However, there is little danger of the filler or modifying agents used in the laminating adhesive being ground away or thrown into the air in appreciable amounts in finely divided form and hence either quartz itself or free silica bearing fillers may as a general proposition be used in the laminating adhesive, if desired, although in general equally or more satisfactory results will be obtained with some other filler which does not contain free silica.

Referring to the drawings:

Figure 1 is a cross-section of an example of coated abrasives made in accordance with my invention.

Referring to Figure 1, 6 is a layer of abrasive grain and 7 is a layer of sand sizing adhesive applied over the abrasive grains after they have been attached to the laminated backing by the making coat of adhesive 8. Numeral 9 denotes, for example, a lamina of cloth adhesively attached by a layer of adhesive 10 to a lamina of a waterlaid web such, for example, as paper or vulcanized fibre 11. The sizing coat of adhesive 12 is applied, for example, over the cloth side of the laminated backing to form a base for the making coat of adhesive 8 before the laminated backing is used for the manufacture of coated abrasives. This sizing coat of adhesive 12 is not always used in carrying out the invention but is sometimes omitted and in such instances the making coat of adhesive 8 is attached directly to the cloth or other lamina 9.

Figure 2:
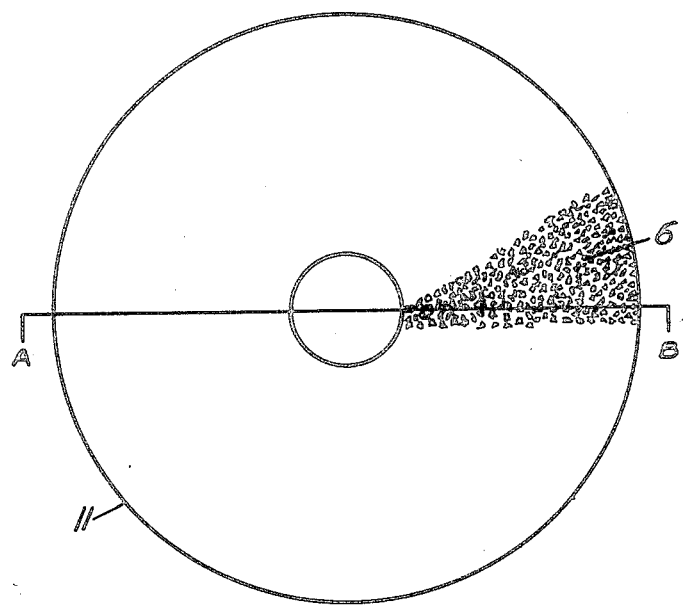

Figure 2 is a plan view of an abrasive disc adapted for use on a yielding supporting pad by attachment at the center only.

Figure 3:
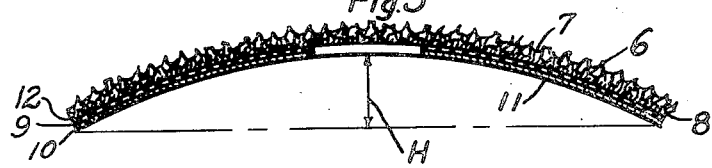

Figure 3 is a cross-section of the disc of Figure 2 on the line A—B. It will be noted from Figure 3 that the diameter of the disc of Figure 2 on the line A—B is substantially the arc of a circle. Such coated abrasive discs normally curl on only one axis so that the diameter of the disc of Figure 2 at right angles to the line A—B in the plane of the disc is substantially a straight line.

The disc of Figure 3 is shown resting on its non-abrasive side on a plane surface. H, in Figure 3, represents the altitude of the center hole above the plane surface on which the disc is resting.

As is well known in the art, it is desirable that such coated abrasive discs have a convex rather than a concave abrasive surface. In other words, it is desired that such abrasive discs, under all working conditions, vary from substantially flat to a moderate and controlled degree of sand convex curl. By a moderate degree of sand convex curl is meant that the altitude H of the coated abrasive disc as illustrated in Figure 3, when the coated abrasive disc has a diameter of 9⅛", should preferably not exceed about 1½" or 1¾", the higher values of "H" being permissible with the less rigid and more flexible backings. The values given for maximum altitudes are such as would occur at low humidities but it is desirable that such maximum altitudes be as small as is consistent with the avoidance of a concave abrasive surface at high humidities.

*Laminated backing, Example 1*

Print cloth 32" wide and weighing 6.41 yards per pound and having a count of 64 warp threads per inch by 60 fill threads per inch is combined with paper weighing 110 lbs. per paper ream. A suitable paper is 110 lb. Fourdrinier kraft paper which has been used extensively or 110 lb. rope cylinder paper which has also been used extensively, especially where a greater strength in the length direction of the paper is required and where the superior tearing strength of rope paper is an advantage.

A suitable adhesive for laminating the print cloth and the 110 lb. paper is one consisting of 31.7 lbs. of 62 millipoise hide glue, 31.7 lbs. of filler and 36.6 lbs. of water. A suitable filler is mechanically ground calcium carbonate (marble or limestone) having an average surface diameter of about 15 microns. This is an adhesive which in its dry state is one-third by volume dry filler and two-thirds by volume dry glue. A suitable temperature for the combining adhesive at the time it is applied is about 165° F. A suitable weight of adhesive is a coating which, when dried, will be equivalent to 8 lbs. per sandpaper ream. The paper is run through a conventional set of calender rolls and the adhesive is applied immediately after which the cloth lamina is applied evenly and smoothly to the top of the adhesive. Conventional laminating equipment such as has heretofore been used in making such combination with unmodified hide glue adhesive is satisfactory for my purpose. The web is dried by known means of the prior art.

*Laminated backing, Example 2*

The paper and cloth of Example 1 may also be combined as described in Example 1 with an adhesive having the following composition:

26.4 lbs. of 62 millipoise hide glue
52 lbs. of suitable filler
5.3 lbs. of wheat flour (known as second clear)
36.6 lbs. of water A suitable filler where this weight of filler is used along with the weights of the other ingredients shown is a filler of barium sulphate having an average surface diameter of about 7 to about 28 microns.

Laminated backings such as those of Examples 1 and 2 are sometimes given a sizing coat of adhesive over the cloth before they are used in the manufacture of coated abrasives. A suitable sizing coat for either Laminated Backing, Example 1, or Laminated Backing, Example 2, is a thin coating of 62 millipoise hide glue applied in the conventional way. A suitable weight of the dry hide glue for such a sizing coat is about 5.5 lbs. per sandpaper ream. However, I prefer to use as a sizing adhesive, if a sizing adhesive is used, which is not always necessary, in the case of either Example 1 or Example 2 above, a sizing adhesive containing filler as a modifier, as, for example, an adhesive consisting of 25.4 lbs. of 62 millipoise hide glue, 25.4 lbs. of filler having a specific gravity of 2.74, and 49.2 lbs. of water. The filler may be the mechanically ground calcium carbonate of Laminated Backing, Example 1, above. A suitable dry weight of this sizing adhesive is about 6 lbs. per sandpaper ream. The sizing adhesive of either the straight hide glue or of the filler modified hide glue is applied in the conventional way by conventional equipment at a temperature of around 165° F., and the web is then dried in the conventional way.

*Laminated backing, Example 3*

A very useful backing for the manufacture of certain coated abrasives and a backing especially useful in the manufacture of sanding discs, is one consisting of a lamina of vulcanized fibre and a lamina of cloth. A suitable grade of vulcanized fibre is what is known as 10 mil vulcanized fibre of abrasive grade which has been used heretofore in making a laminated backing by attaching cloth to it by means of an adhesive of hide glue. A suitable cloth is a drills cloth 38½" wide, weighing 2.14 yards per pound and having a 14's warp and a 12's fill yarn and a count of 72×48. Before combining with the fibre, the cloth should be given a desizing operation such as is used in preparing cloth for conventional fibre-combination abrasive backings.

A suitable adhesive for use in attaching the cloth to the vulcanized fibre is the following:

30.9 lbs. of 86 millipoise hide glue
41.8 lbs. of a filler consisting of mechanically ground calcium carbonate having an average surface diameter of about 15 microns
27.3 lbs. of water Appropriate amounts of other fillers with the correct particle size and shape and properties as described herein may be used, as, for example, such fillers derived from garnet, fused aluminum oxide, barium sulphate, calcium phosphate, and the like.

The adhesive is applied to the fibre and the cloth is combined therewith in the conventional manner and by the conventional equipment of the prior art. A suitable temperature for the adhesive at the time it is applied, is about 170° F. A suitable weight of laminating adhesive is one which, when dry, will give a combining adhesive weight of 18.5 lbs. per sandpaper ream. The web is dried and handled by conventional means.

*Laminated backing, Example 4*

The same fibre and the same cloth are employed as in Example 3 above. The combining adhesive, however, has the following composition:

26.2 lbs. of glue
7.3 lbs. of dextrin
44.2 lbs. of filler (the filler of Example 3 above or an equivalent volume of other suitable filler as disclosed herein)
22.0 lbs. of water The adhesive is applied at the same temperature and in the same manner as the adhesive of Laminated Backing, Example 3. A suitable dry weight of this combining adhesive is 19 lbs. per sandpaper ream.

While such is not always the case, more often than not such laminated backings as those of Examples 3 and 4 are given a sizing coat of adhesive on the cloth side before the abrasive grains are attached thereto.

Such sizing adhesives may consist of straight hide glue or of a filler modified hide glue. Where hide glue is used as the sizing adhesive, a suitable solution is one consisting of 43 lbs. of 86 millipoise hide glue and 57 lbs. of water. This sizing adhesive may be applied in the conventional way to the cloth side of the laminated backing of Examples 3 and 4 above, a suitable coating weight of adhesive being one which when dry will weigh 2.2 lbs. per sandpaper ream. A suitable temperature for application of this sizing coat is 170° F. The sized web is dried by conventional means.

In lieu of the foregoing unmodified hide glue I may apply a sizing adhesive to the cloth side of the combination of Examples 3 and 4 consisting of:

25.4 lbs. of glue
25.4 lbs. of filler (mechanically ground calcium carbonate having an average surface diameter of about 15 microns or an equivalent volume of other suitable filler)
49.2 lbs. of water This adhesive is applied in the same way as the conventional hide glue adhesive is applied, a suitable coating temperature being 170° F. and a suitable weight of the dry sizing adhesive being 2.6 lbs. per sandpaper ream.

*Laminated backing, Example 5*

Two plies of 65 lb. rope Fourdrinier paper are laminated, using a laminating adhesive having the following composition:

26.2 lbs. of glue
7.3 lbs. of dextrin
44.2 lbs. of filler (the calcium carbonate filler of the previous examples or an equivalent volume of other suitable fillers as defined herein)
22.0 lbs. of water The combination is made on conventional equipment, a suitable temperature for the application of the adhesive being 170° F. A suitable weight of the laminating adhesive will be a weight which when dry is equivalent to 7 lbs. per sandpaper ream.

*Laminated backing, Example 6*

This backing is the same as the backing made according to Example 5 above, except that the adhesive used has the following composition:

30.9 lbs. of glue
41.8 lbs. of filler (the calcium carbonate filler of the previous examples or equivalent volume of other suitable fillers defined herein)
27.3 lbs. of water Where filler modified adhesives are used for laminating and sizing, as explained heretofore, or in coating to attach the abrasive grains to the backing, as explained hereafter, such adhesives may be conveniently mixed as follows:

All the ingredients should be weighed out separately. Cover the bottom of a warm conventional glue cooking kettle with lukewarm water to a depth of about one-half inch. Then start adding the glue, adding simultaneously additional lukewarm water and so proportioning the rates at which the glue and water are added that all the dry glue will be added by the time one-half of the total water is added. The water and glue are stirred until the mixture is uniform. After the glue is thoroughly mixed with one-half of the water, the filler is added, with the stirrer running at all times, the filler being added as quickly as possible. Stirring is continued until all of the filler is wetted, and then the balance of the water is added and stirring is continued until the modified glue solution is completely cooked. The glue kettle should be maintained in a warm or heated condition throughout all of the foregoing operations. Heat should continue to be supplied to cook the glue until it is smooth and free from lumps and at the desired coating temperature. A suitable temperature for the final cooking of the glue is about 170° F. It is desirable that the glue be used as quickly as possible after its final preparation.

The various backings as illustrated in the foregoing examples and discussions thereof, may be used in making a number of forms of coated abrasives, as will be illustrated by the examples which follow:

*Coated abrasive, Example 1*

As a backing for this coated abrasive I may take any one of the backings of Examples 1 and 2 or modifications thereof already described but to give a specific illustration I will take the laminated backing of Example 1 to which has been applied, on the cloth side, a light sizing adhesive consisting of about 6 lbs. per sandpaper ream (dry weight) of a composition of 25.4 lbs. of glue to 25.4 lbs. of filler to 49.2 lbs. of water.

To this backing I apply, by a conventional sandpaper making machine on the cloth side, a making coat of adhesive consisting of 31.1 lbs. of 86 millipoise glue, 31.1 lbs. of calcium carbonate filler having an average surface diameter of about 15 microns (or an equivalent volume of other suitable fillers, such suitable fillers being described herein and in U. S. Patent No. 2,322,156) and 37.8 lbs. of water. The adhesive is mixed as already described and brought to a suitable coating temperature, as, for example, 155° F. and is applied to the cloth side of the backing in the usual way on a conventional sandpaper making machine. A suitable wet weight of the adhesive, that is, of the adhesive as applied, is 16.5 lbs. per sandpaper ream. After the making coat of adhesive has been applied, as described, I apply a coating of No. 16 grit silicon carbide abrasive grains to form what is known as an open coating. A suitable weight of such abrasive grains is about 31 lbs. per sandpaper ream. After the abrasive grits have been applied in the conventional way and the web has been festooned for a short time to partially dry it, I then apply in the conventional way a sand sizing coat of adhesive. A suitable composition for the sand sizing adhesive is one consisting of 20.4 lbs. of 86 millipoise hide glue, 40.8 lbs. of filler (calcium carbonate filler as used in the making coat of this example or an equivalent volume of other suitable filler as defined under the making coat) and 38.8 lbs. of water. The sizing adhesive is mixed as heretofore described for such mixtures and after proper cooking is brought to a temperature of about 155° F. and applied over the abrasive grains in the conventional manner as a sizing coat, a suitable wet weight of the sizing coat being 22 lbs. per sandpaper ream. The goods are then passed to a conventional sandpaper drying room and dried, after which they may be processed and handled, generally in accord with the known art of making glue bond sandpaper.

The article just described is used widely in the finishing of floors, particularly in refinishing old floors from which paint, fillers, and the like must be removed before the refinishing operation. One method of use of such a coated abrasive is as a drum cover on a conventional floor sanding machine. Another method is to use the coated abrasive in the form of discs. This latter form of the invention is particularly useful around the walls and in the corners of rooms where the sanding cannot be carried out completely with the conventional drum sanding floor machine. There is also use of such a coated abrasive in the form of belts and various other forms.

The coated abrasive of this example is generally heat resistant, has an adhesive bond between the lamina which is heat resistant and in particular has better curling characteristics than a similar coated abrasive made on a laminated backing in which unmodified hide glue is used as the laminating adhesive.

*Coated abrasive, Example 2*

This example will illustrate the manufacture of a very efficient abrasive disc which finds widespread use in sanding various forms of metal such as welds, rough surfaces, and the like. As a backing I may take the various forms of backings illustrated by Laminated Backing, Examples 3 and 4 and modifications thereof, as disclosed herein. To be specific I will take the laminated backing of Example 3, to the cloth side of which has been added a sizing adhesive consisting of 25.4 lbs. of 86 millipoise hide glue, 25.4 lbs. of filler (mechanically ground calcium carbonate having an average surface diameter of about 15 microns) and 49.2 lbs. of water, the sizing adhesive having been applied in an amount to give a dry sizing adhesive weight of 2.6 lbs. per sandpaper ream.

For the abrasive grain I will select No. 24 fused aluminum oxide, this being a very important abrasive for use in the manufacture of metal sanding discs.

For a making coat of adhesive I employ a composition consisting of 30.4 lbs. of 86 millipoise hide glue, 30.4 lbs. of filler (the calcium carbonate filler of the previous examples or an equal volume of other suitable fillers) and 39.2 lbs. of water. This adhesive is mixed as previously explained and after cooking is brought to a suitable application temperature such as 160° F. and applied by a conventional sandpaper machine to the cloth side of the backing in an amount equivalent to a wet weight of 15.0 lbs. per ream. After the adhesive is applied, there is applied to the adhesive an open coating of a No. 24 abrasive grain in an amount equivalent to about 42 lbs. per sandpaper ream. The web is then festooned, dried and taken down and returned to the front of the sandpaper coating machine. An adhesive coating is then applied over the abrasive grains, the composition of the coating being 20.2 lbs. of 86 millipoise hide glue, 40.4 lbs. of filler (the calcium carbonate heretofore used or equivalent substitutes in appropriate amount) and 39.4 lbs. of water. A suitable temperature for the application of this adhesive over the grains is 165° F. and a suitable wet weight of the coating is 18 lbs. per sandpaper ream. After this adhesive has been applied and while it is still wet, an additional coating of abrasive grains is applied thereto in an amount sufficient to bring the total abrasive weight (including the grain previously added) up to about 95 lbs. per sandpaper ream. After this coating of abrasive grains has been added, the web is festooned for a short while and then passed through a conventional sizing machine where a sand sizing adhesive is added over the top of the grains. A suitable composition for this sand sizing adhesive is one consisting of 18.9 lbs. of 86 millipoise hide glue, 37.8 lbs. of filler (calcium carbonate or an appropriate quantity of equivalent filler) and 43.4 lbs. of water. A suitable wet weight for the adhesive coating applied is 32 lbs. per sandpaper ream and this coating may be conveniently applied at a temperature of 165° F.

After the web is thus sized, it is dried in a conventional sandpaper drying room and taken down in the usual way. After the roll of goods has been allowed to age and dry or has been positively dried by known means to remove the excess moisture left in the web to permit its removal from the sandpaper drying racks, conventional abrasive discs are cut in the conventional way.

For example, abrasive discs 9⅛" in diameter and with a ⅞" center hole were cut from this web and compared with control discs similarly made but having a backing in which the vulcanized fibre and cloth were united and the cloth was sized by an adhesive of unmodified hide glue. The laminating adhesive of Coated Abrasive, Example 2, proved to be more heat resistant in actual tests than the laminating adhesive of the control discs. A number of these discs of Coated Abrasive, Example 2, and similar control discs of the prior art having a laminated backing held together by hide glue were compared at various humidities using the altitude, H, illustrated in Figure 3 as a measure of the variation in curl. At a temperature of 75° F. and a relative humidity of 71% discs of Coated Abrasive, Example 2, were substantially flat whereas the control discs used for comparison had a slightly concave abrasive surface. At a temperature of 71° F. and a relative humidity of 51%, H was equal to 0.2" in the case of discs of Coated Abrasive, Example 2, whereas in the case of the control discs, H was equal to 0.55". At a temperature of 70° F. and a relative humidity of 37%, H in the case of the discs of Coated Abrasive, Example 2, was equal to 1.05" whereas in the case of the control discs, H was equal to 1.75". At a temperature of 77° F. and a relative humidity of 28%, H in the case of discs of Coated Abrasive, Example 2, was equal to 1.5", whereas H in the case of the control discs was equal to 2.25". At a temperature of 90° F. and a relative humidity of 20%, H in the case of the discs of Coated Abrasive, Example 2, was equal to 1.6", whereas H in the case of the control discs was equal to 2.45". These discs clearly show the superiority of the discs of Coated Abrasive, Example 2, over those of the prior art in regard to curling characteristics. Values given for "H" are the average of values of a number of samples and therefore representative.

*Coated abrasive, Example 3*

The materials and the method of manufacture in the case of Coated Abrasive, Example 3, are in every way identical with the corresponding materials and procedures of Coated Abrasive Example 2, except that the laminated backing used in Example 3 consists of Laminated Backing, Example 3, to the cloth side of which has been added a sizing adhesive consisting of 86 millipoise hide glue in an amount sufficient to give a dry adhesive weight of 2.2 lbs. per sandpaper ream.

The web of Coated Abrasive, Example 3, having been prepared, that is, coated and handled, exactly as described for Coated Abrasive, Example 2, abrasive discs having a diameter of 9⅛" and a center hole of ⅞" were again cut and tested. The laminating adhesive again proved to be more heat resistant than a laminating adhesive of hide glue as used in the prior art discs. Furthermore, there was no failure due to heat at the union between the making coat of adhesive and the cloth backing. I attribute this to the fact that only a small amount of hide glue is used to size the backing before the making coat of adhesive is applied and to the further fact that there is probably mingling between the heat resistant making coat and the previously applied sizing coat of hide glue. Also, a substantial part of the small amount of glue used in sizing the backing sinks into the cloth and this may also be a reason why there was no failure due to lack of heat resistance at the union between the cloth and the making coat of adhesive.

These discs of Coated Abrasive, Example 3, and also control discs of the prior art similarly made but with a hide glue laminating adhesive were compared at various humidities. At a temperature of 75° F. and a relative humidity of 71%, H, as illustrated in Figure 3, in the case of the discs of Coated Abrasive, Example 3, was equal to 0.35" whereas the control discs had a very slight sand concave surface. At a temperature of 77° F. and a relative humidity of 28%, H, in the case of the abrasive discs of Coated Abrasive, Exampe 3, was equal to 1.15", whereas H in the case of the control discs was 2.25". At a temperature of 90° F. and a relative humidity of 20%, H, in the case of discs of Coated Abrasive, Example 3, was equal to 1.25", whereas H in the case of the control discs was 2.45". These tests again thoroughly demonstrate the superiority, from the standpoint of curl, of the discs of the present invention as compared with those of the prior art. Values given for H are the average of values of a number of samples and therefore representative.

*Coated abrasive, Example 4*

In this case the coated abrasive is made using the same materials and as explained under Coated Abrasive, Example 3, except in so far as the final sizing coat of adhesive applied over the grains is concerned. In this case instead of using a sand sizing adhesive as explained under Coated Abrasive, Example 3, I employ a sand sizing adhesive having the following composition:

| | Pounds |
|---|---|
| Low temperature curing phenol-formaldehyde resin having a solids content of 80%_ | 32 |
| Filler (calcium carbonate filler of the previous examples is very satisfactory; appropriate amounts of other suitable fillers may be used) | 54 |
| Water | 14 |

This adhesive is applied in the same way as glue, that is, by a conventional sandpaper coating machine but preferably the temperature of application is 100° F., as high temperatures cause the resin to become uncoatable at too rapid a rate. A suitable wet weight for the sand sizing adhesive of this composition is 28 lbs. per sandpaper ream. The coated abrasive is then dried according to conventional practice for glue bond after which it is given a curing operation according to the known art, to develop the tensile strength and hardness of the resin-filler composition.

After drying and curing as required, the webs of Coated Abrasive, Example 4, are stamped into the form of discs according to the conventional practice as has been used heretofore in the manufacture of glue bond discs.

The discs of Coated Abrasive, Example 4, are very heat-resistant, especially since they not only have a heat-resistant adhesive to anchor the grains in place but also a heat-resistant adhesive to hold the laminae together whereby delamination in use due to softening of the laminating adhesive by heat is avoided.

*Coated Abrasive, Example 5*

As a backing I employ the laminated backing of Example 5 or of Example 6 and I make No. 30 silicon carbide paper, closed coating, a product which is used widely in the floor sanding field and which is also useful for various drum sanding operations and which finds some use in belts in addition to the popular floor sanding forms of sheets, rolls and discs.

As a making adhesive I will use one having the following composition:

30.7 lbs. of 86 millipoise hide glue
30.7 lbs. of filler (the calcium carbonate filler of the previous examples or appropriate amounts of other suitable fillers)
38.3 lbs. of water This adhesive is mixed as heretofore explained for this type of adhesive and after cooking is brought to the proper coating temperature of 160° F. and passed to the coating box of a conventional sandpaper machine. A coat of this adhesive is applied to the laminated backing in the usual way, a suitable wet weight of the adhesive being 12 lbs. per sandpaper ream and after the adhesive is applied, a coating of No. 30 silicon carbide is applied in the conventional way, a suitable coating weight of the grain being about 55 lbs. per sandpaper ream. After the abrasive is applied, the web is festooned for a short while and then passed to a sand sizing machine where a sizing coat of adhesive having the following composition is applied:

18.1 lbs. of 86 millipoise hide glue
36.2 lbs. of filler (as described for the making coat)
45.7 lbs. of water The adhesive is mixed as previously described and brought to a coating temperature of 160° F. and applied in the usual way, a suitable wet weight of the sand sizing adhesive being 16.5 lbs. per sandpaper ream. After the sizing operation the goods are passed through a conventional sandpaper drying room and handled, as has heretofore been customary in the manufacture of glue bond sandpaper.

When properly dried the web of Coated Abrasive, Example 5, may be converted into belts, drum covers and the like. It is, however, particularly useful in making drum covers for floor sanding machines and the usual types of discs used in floor sanding. The laminating adhesive of Coated Abrasive, Example 5, is heat resistant but, what is more important in this particular product, is the improved curling characteristics of the various articles cut from this web as compared with articles similarly made but having a laminating adhesive of unmodified hide glue between the laminae of the backing.

Many variations may be made in my invention that has been illustrated by the foregoing examples. Many variations in the lamina of the backing will occur to those skilled in the art in adapting my invention to the many uses of coated abrasives which already exist, as well as new uses which are being developed from time to time. Likewise, many variations may be made in the binder used to anchor the grits to the laminated backing.

In particular many variations may be made in my laminating adhesive. For example, many variations of filler composition may be used so long as the filler has the properties recited as being required. As has been made clear, animal glues and combinations of animal glues and vegetable glues are particularly useful in carrying out my invention, that is, in formulating the laminating adhesive for use in my laminated backing for coated abrasives. Many glues other than those used by way of illustration in the various examples given are suitable for my purpose.

In referring to vegetable glues, I mean to include starches, vegetable gums, such as dextrins of various types which are derived from various starches, vegetable glues such as the alkali treated starches generally known in the trade as vegetable glues and suitable vegetable proteins of an adhesive character which are soluble in hot water and miscible with animal glues dissolved in hot water, as, for example, certain glutins and also vegetable proteins derived from the soya bean and known as glues, which are dispersible in hot water and miscible with animal glues. In general vegetable proteins which have a reasonable adhesive strength as such, are soluble in hot water and are miscible with animal glues dissolved in hot water as is customary in the use of animal glues are suitable for use along with animal glues in carrying out my invention.

All modifications coming within the scope of the appended claims and their equivalents are included within the invention.

I claim:

1. A coated abrasive having a laminated backing and abrasive grits adhesively attached thereto, comprising at least two laminae in the backing adhesively united with a modified adhesive, the basic adhesive of which expands with gain of moisture and contracts with loss of moisture, said basic adhesive being softenable by heat, the said modified adhesive being the said basic adhesive modified with a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in amount of about 25% to about 45% by volume to substantially lower the rate at which the said modified adhesive expands with gain of moisture or contracts with loss of moisture as compared with the rate at which the said basic adhesive expands with gain of moisture or contracts with loss of moisture and to materially increase the heat resistance and raise the temperature of softening of the said modified adhesive as compared with the same properties of the said basic adhesive, whereby the said coated abrasive is rendered more resistant to delamination by heat and strains encountered in use and has improved curling characteristics as compared with a coated abrasive similarly made but in which the laminating adhesive is the said unmodified basic adhesive.

2. A coated abrasive having a laminated backing and abrasive grits adhesively attached thereto, comprising at least two laminae in the backing adhesively united with a modified animal glue adhesive the basic adhesive of animal glue of which expands with gain of moisture and contracts with loss of moisture, said basic adhesive of animal glue being softenable by heat, said modified animal glue adhesive being modified with a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in amount of about 25% to about 45% by volume to substantially lower the rate at which the said modified animal glue adhesive expands with gain of moisture or contracts with loss of moisture as compared with the said basic adhesive of animal glue and to materially increase the heat resistance and raise the temperature of softening of the said modified animal glue adhesive as compared with the same properties of the said basic adhesive of animal glue, whereby the coated abrasive is rendered more resistant to delamination by heat and strains encountered in use and has improved curling characteristics as compared with a coated abrasive similarly made but in which the laminating adhesive is the said basic adhesive of animal glue.

3. A coated abrasive having a laminated backing and abrasive grits adhesively attached thereto, comprising at least two laminae in the backing adhesively united with a modified adhesive the basic adhesive of which consists of animal glue and vegetable glue and which expands with gain of moisture and contracts with loss of moisture, said basic adhesive being softenable by heat, said modified adhesive being the said basic adhesive modified with a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in amount of about 25% to about 45% by volume to substantially lower the rate at which the said modified adhesive expands with gain of moisture or contracts with loss of moisture as compared with the rate at which the said basic adhesive expands with gain of moisture or contracts with loss of moisture and to materially increase the heat resistance and raise the temperature of softening of the said modified adhesive as compared with the same properties of the said basic adhesive, whereby the coated abrasive is rendered more resistant to delamination by heat and strains encountered in use and has improved curling characteristics as compared with a coated abrasive similarly made but in which the laminating adhesive is the said basic adhesive.

4. A coated abrasive according to claim 3 in which the vegetable glue used is derived from starch.

5. A coated abrasive according to claim 3 in which the vegetable glue used is a vegetable protein which is soluble in hot water and miscible with animal glue similarly dissolved in hot water.

6. A coated abrasive according to claim 3 in which the vegetable glue used is a dextrin.

7. A laminated backing for a coated abrasive comprising at least two laminae adhesively united with a modified adhesive, the basic adhesive of which expands with gain of moisture and contracts with loss of moisture, said basic adhesive being softenable by heat, the modified adhesive being the basic adhesive modified with a substantial percent by volume of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in amount of about 25% to about 45% by volume to substantially lower the rate at which the modified adhesive expands with gain in moisture or contracts with loss of moisture as compared with the rate at which the said basic adhesive expands with gain of moisture or contracts with loss of moisture and to materially increase the heat resistance and raise the temperature of softening of the said modified adhesive as compared with the same properties of the basic adhesive, whereby the said laminated backing is rendered resistant to delamination by heat and strains encountered in use of coated abrasives made therewith by adhesively anchoring abrasive grains to at least one side of the said laminated backing and has improved curling characteristics as compared with a coated abrasive similarly made but in which the laminating adhesive is the said basic adhesive.

8. A laminated backing for coated abrasives according to claim 7 in which the basic adhesive consists of animal glue.

9. A laminated backing for coated abrasives accoding to claim 7 in which the basic adhesive consists of animal glue and vegetable glue.

DONALD A. WATERFIELD.

REFERENCES CITED

The following references are of record in the file of this patent:

UNITED STATES PATENTS

| Number | Name | Date |
| --- | --- | --- |
| 2,398,224 | Hackett | Apr. 9, 1946 |
| 2,322,156 | Oglesby | June 15, 1943 |